(12) United States Patent
Abotabl et al.

(10) Patent No.: US 11,743,747 B2
(45) Date of Patent: Aug. 29, 2023

(54) UPLINK BEAM FAILURE RECOVERY FOR FULL-DUPLEX OPERATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 17/211,653

(22) Filed: Mar. 24, 2021

(65) Prior Publication Data

US 2021/0306876 A1    Sep. 30, 2021

Related U.S. Application Data

(60) Provisional application No. 63/000,900, filed on Mar. 27, 2020.

(51) Int. Cl.
*H04W 24/04* (2009.01)
*H04W 72/044* (2023.01)

(52) U.S. Cl.
CPC ......... *H04W 24/04* (2013.01); *H04W 72/046* (2013.01)

(58) Field of Classification Search
CPC . H04B 7/0695; H04B 7/0404; H04W 72/046; H04W 24/04; H04W 72/14; H04L 1/1614; H04L 1/0008
See application file for complete search history.

(56) References Cited

U.S. PATENT DOCUMENTS

| | | | |
|---|---|---|---|
| 2020/0396744 A1 | 12/2020 | Xiong et al. | |
| 2021/0006321 A1* | 1/2021 | Wang | H04W 16/28 |
| 2021/0045125 A1 | 2/2021 | Mondal et al. | |
| 2021/0083911 A1 | 3/2021 | Morozov et al. | |
| 2021/0105058 A1* | 4/2021 | Lin | H04B 7/0695 |
| 2022/0368406 A1* | 11/2022 | Kang | H04W 74/0833 |

* cited by examiner

*Primary Examiner* — Anez C Ebrahim
(74) *Attorney, Agent, or Firm* — Arun Swain; Harrity & Harrity, LLP

(57) ABSTRACT

Various aspects of the present disclosure generally relate to wireless communication. In some aspects, a wireless node may monitor for a beam failure trigger condition on an uplink; detect, based at least in part on monitoring for the beam failure trigger condition, an uplink beam failure associated with the uplink; and trigger an uplink beam failure recovery procedure based at least in part on detecting the uplink beam failure associated with the uplink. Numerous other aspects are provided.

28 Claims, 11 Drawing Sheets

UPLINK BEAM FAILURE RECOVERY FOR FULL-DUPLEX OPERATION

CROSS-REFERENCE TO RELATED APPLICATION

This patent application claims priority to U.S. Provisional Patent Application No. 63/000,900, filed on Mar. 27, 2020, entitled "UPLINK BEAM FAILURE RECOVERY FOR FULL-DUPLEX OPERATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for uplink beam failure recovery for full-duplex operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a wireless node, may include monitoring for a beam failure trigger condition on an uplink; detecting, based at least in part on monitoring for the beam failure trigger condition, an uplink beam failure associated with the uplink; and triggering an uplink beam failure recovery procedure based at least in part on detecting the uplink beam failure associated with the uplink.

In some aspects, a wireless node for wireless communication may include a memory and one or more processors coupled to the memory. The memory and the one or more processors may be configured to monitor for a beam failure trigger condition on an uplink; detect, based at least in part on monitoring for the beam failure trigger condition, an uplink beam failure associated with the uplink; and trigger an uplink beam failure recovery procedure based at least in part on detecting the uplink beam failure associated with the uplink.

In some aspects, a non-transitory computer-readable medium may store one or more instructions for wireless communication. The one or more instructions, when executed by one or more processors of a wireless node, may cause the one or more processors to monitor for a beam failure trigger condition on an uplink; detect, based at least in part on monitoring for the beam failure trigger condition, an uplink beam failure associated with the uplink; and trigger an uplink beam failure recovery procedure based at least in part on detecting the uplink beam failure associated with the uplink.

In some aspects, an apparatus for wireless communication may include means for monitoring for a beam failure trigger condition on an uplink; means for detecting, based at least in part on monitoring for the beam failure trigger condition, an uplink beam failure associated with the uplink; and means for triggering an uplink beam failure recovery procedure based at least in part on detecting the uplink beam failure associated with the uplink.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
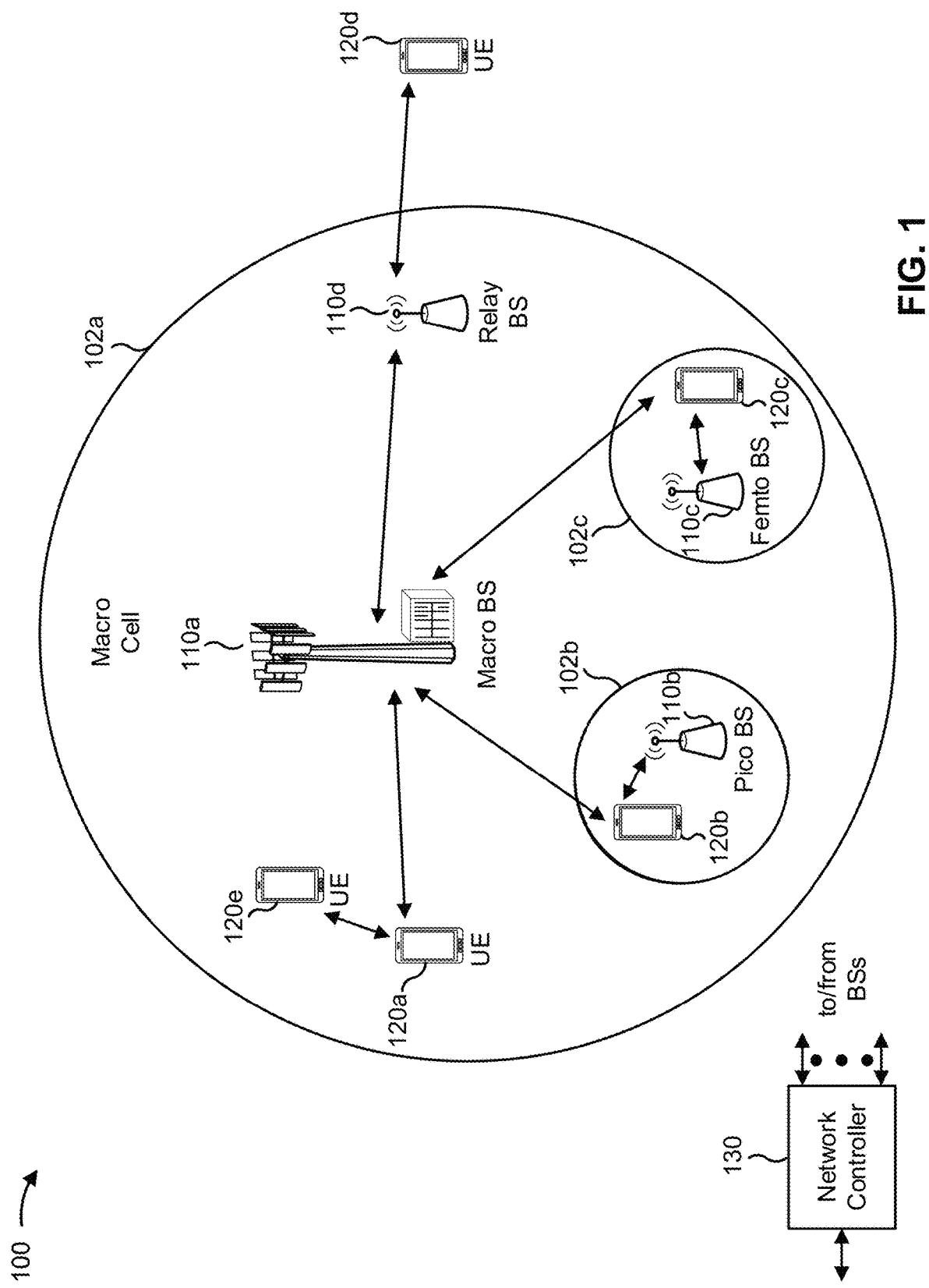
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
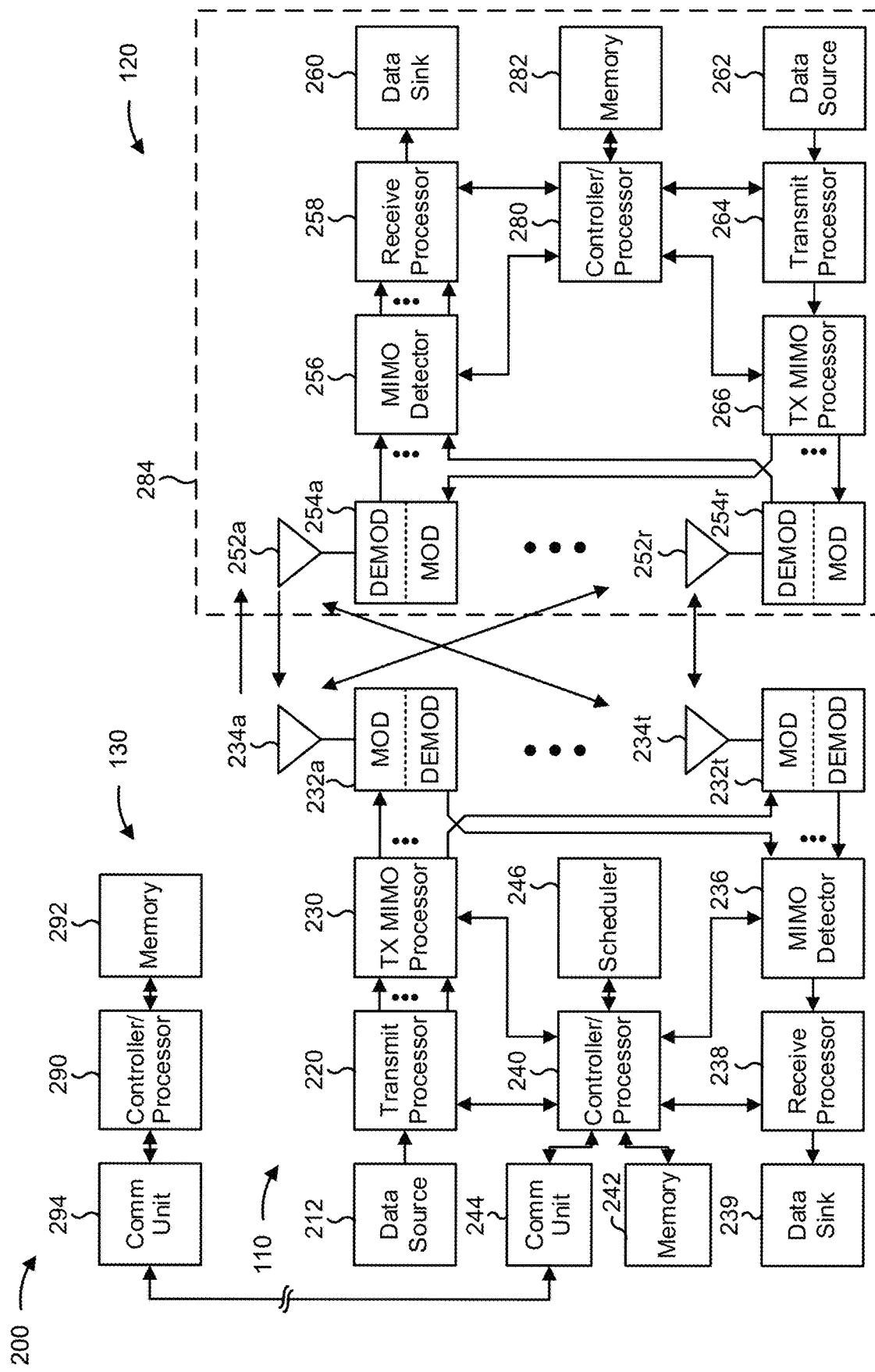
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure.

Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7A-7C).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7A-7C).

Controller/processor 240 of base station 110, controller/processor 280 of UE 120, and/or any other component(s) of FIG. 2 may perform one or more techniques associated with uplink beam failure recovery for full-duplex operation, as described in more detail elsewhere herein. In some aspects, the wireless node described herein is the base station 110, is included in the base station 110, or includes one or more components of the base station 110 shown in FIG. 2. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8 and/or other processes as described herein. In some aspects, executing instructions may include running the instructions, converting the instructions, compiling the instructions, and/or interpreting the instructions, among other examples.

In some aspects, a wireless node includes means for monitoring for a beam failure trigger condition on an uplink; means for detecting, based at least in part on monitoring for the beam failure trigger condition, an uplink beam failure associated with the uplink; and/or means for triggering an uplink beam failure recovery procedure based at least in part on detecting the uplink beam failure associated with the uplink. In some aspects, the means for the wireless node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless node to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, UE 120 may include means for monitoring for a beam failure trigger condition on an uplink, means for detecting, based at least in part on monitoring for the beam failure trigger condition, an uplink beam failure associated with the uplink, means for triggering an uplink beam failure recovery procedure based at least in part on detecting the uplink beam failure associated with the uplink, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
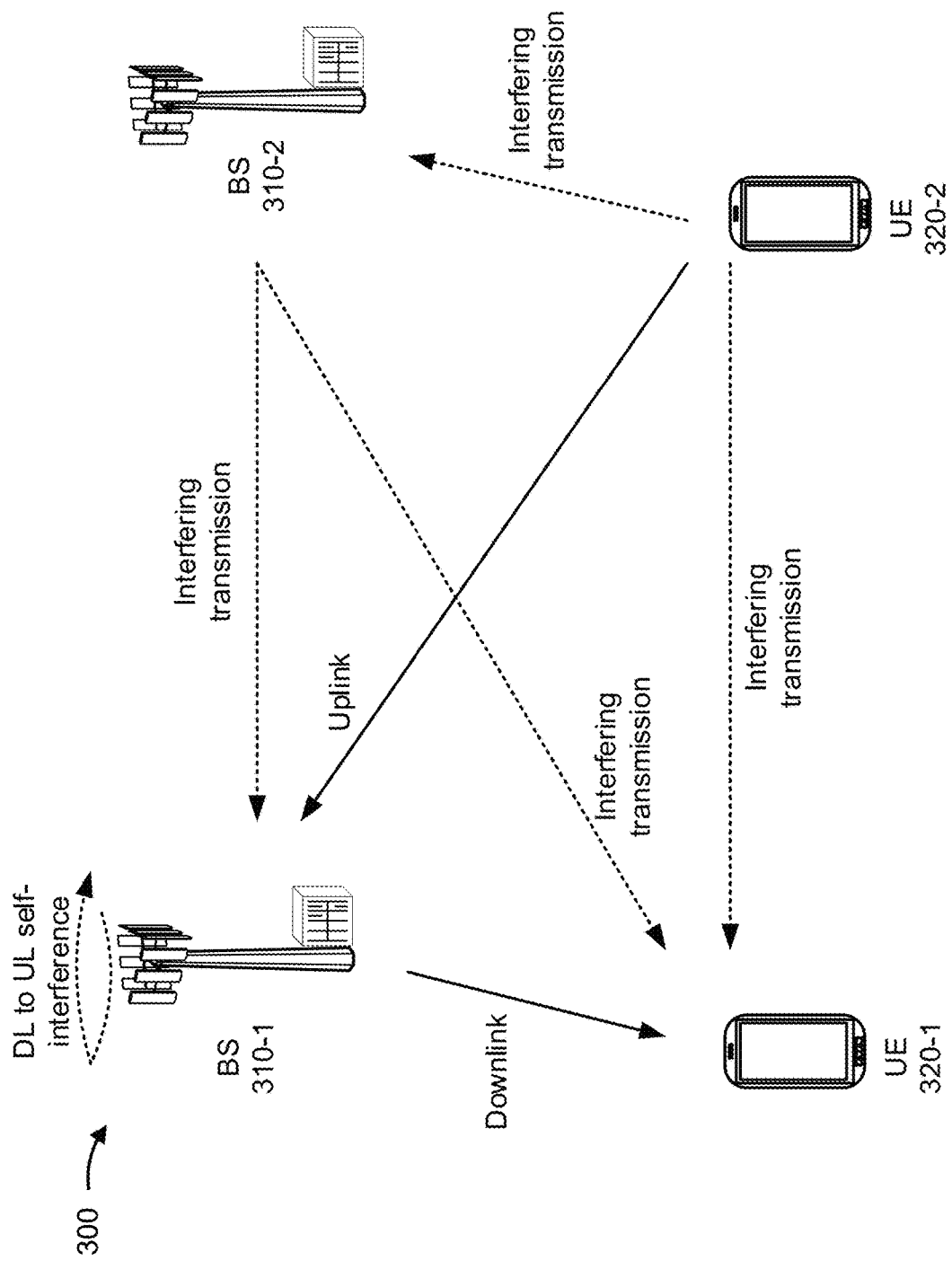
FIGS. 3-5 are diagrams illustrating one or more examples of full-duplex operation modes, in accordance with the present disclosure.
Figure 4:
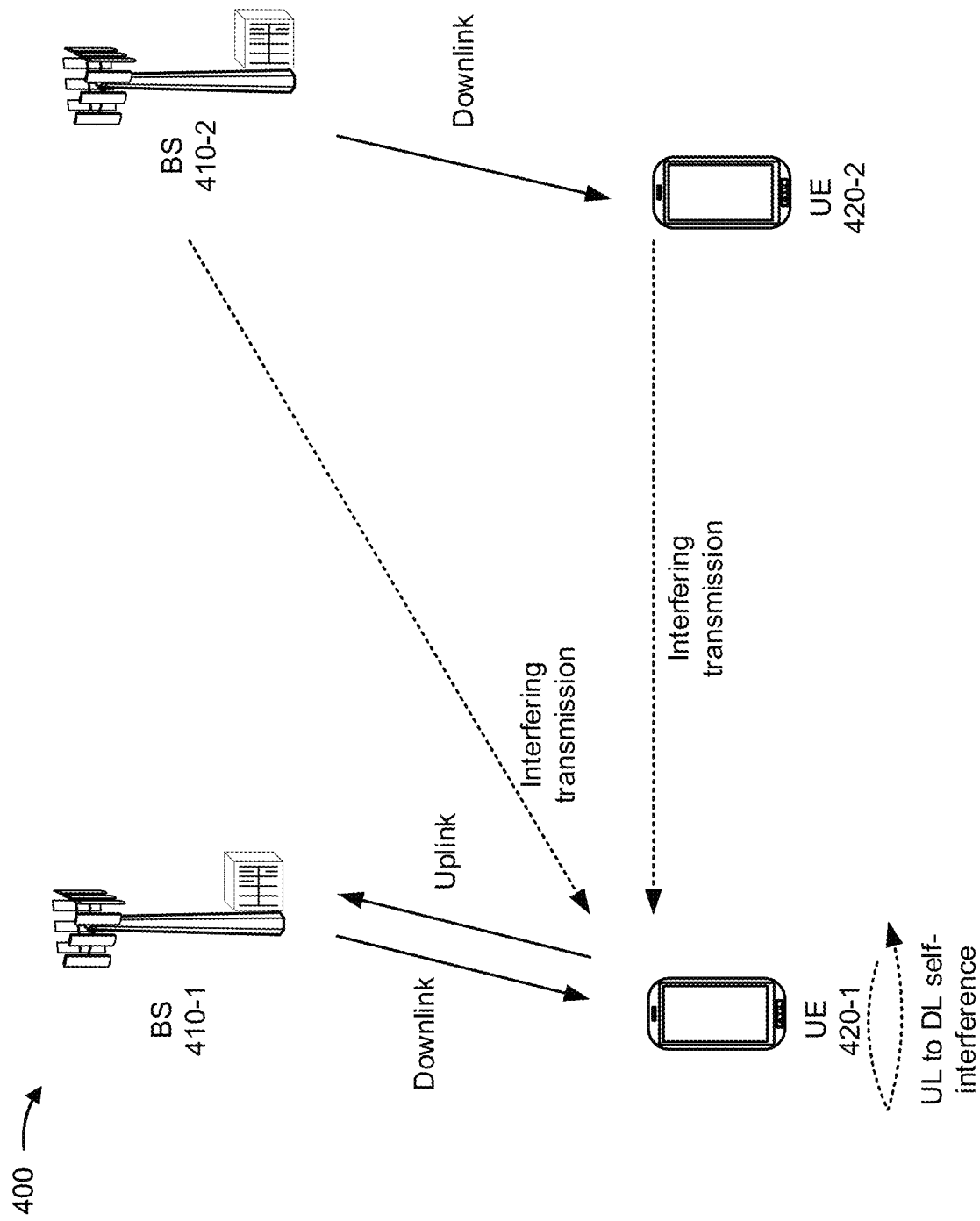
Figure 5:
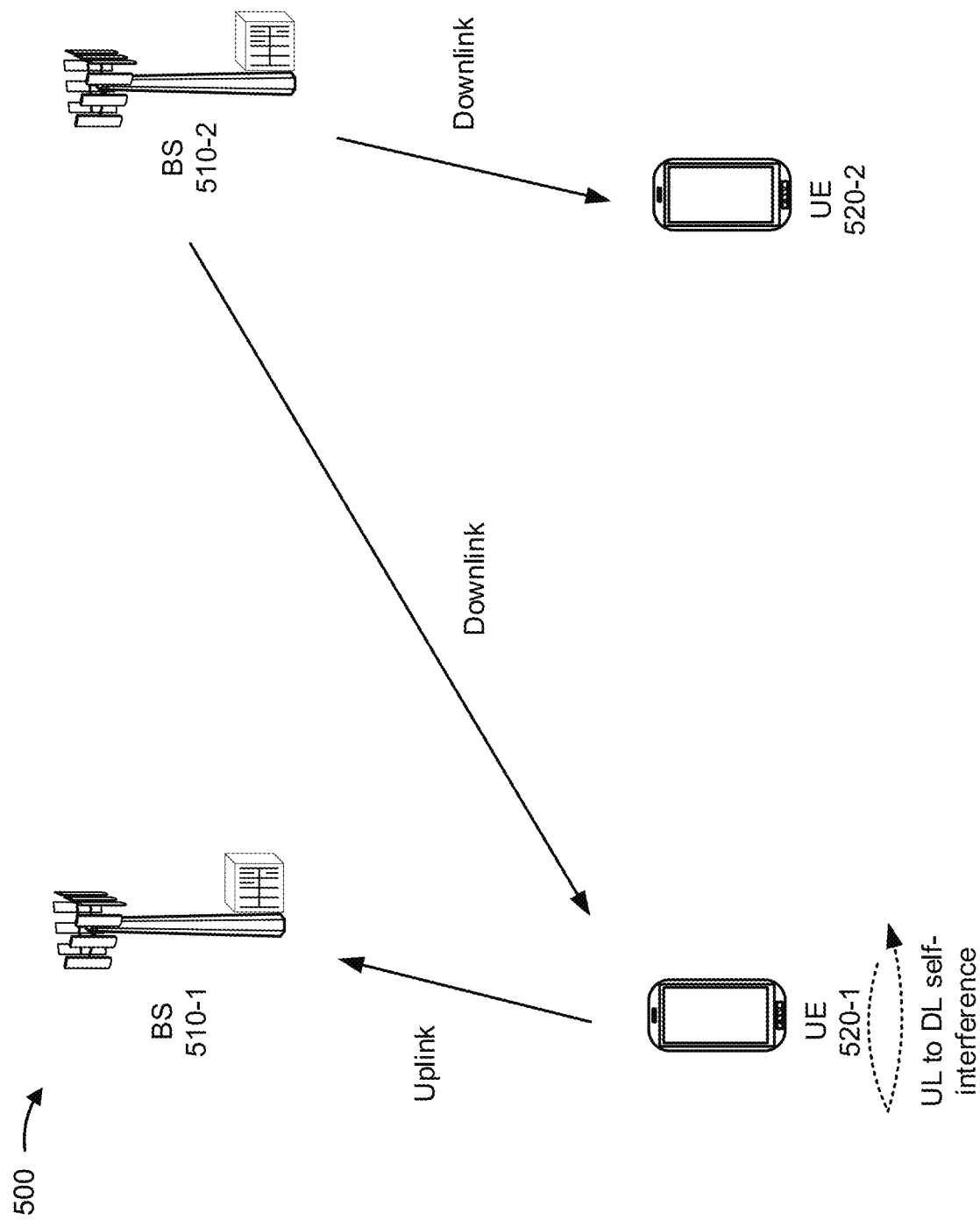

FIGS. 3-5 are diagrams illustrating one or more examples of full-duplex operation modes, in accordance with the present disclosure. A UE and a BS may communicate with each other using beams. For example, a beam may be a downlink beam (e.g., on which information may be conveyed from the BS to the UE) or an uplink beam (e. g, on which information may be conveyed from the UE to the BS). In some aspects, the UE and the BS may be integrated access backhaul (IAB) wireless nodes.

A communication link between a UE and a BS may be referred to as half-duplex when the communication link includes only one of an uplink or a downlink or full-duplex when the communication link includes an uplink and a downlink. In some aspects, a full-duplex communication link may be an in-band full duplex (IBFD) communication link (e.g., a communication link that includes an uplink and a downlink that share the same time and/or frequency resources). In some aspects, a full-duplex communication link may be a sub-band frequency division duplex (FDD) communication link (e.g., a communication link that includes an uplink and a downlink that share the same time resources, but use different frequency resources). IBFD and sub-band FDD are provided merely as examples of full-duplex types.

A full-duplex communication link may provide increased scalability of data rates on the link in comparison to a half-duplex communication link. In a full-duplex communication link, different antenna elements, sub-arrays, or antenna panels of a wireless communication device may simultaneously or contemporaneously perform uplink and downlink communication.

Full-duplex communication may present certain challenges in comparison to half-duplex communication. For example, a wireless communication device (e.g., a UE, a BS, and/or a wireless node) may experience self-interference between an uplink beam and a downlink beam of a full-duplex link or between components of the wireless communication device. This self-interference may complicate the monitoring of reference signals to detect beam failure. Furthermore, self-interference, cross-correlation, and/or the like, may occur in a full-duplex communication link that may not occur in a half-duplex communication link. Additionally, a wireless communication device may experience interfering transmissions from other wireless communication devices (e.g., based at least in part on an angular spread of a beam transmitted by the other wireless communication devices) in the wireless network that may cause a beam failure (e.g., an uplink beam failure, a downlink beam failure, and/or the like).

As shown in FIG. 3, an example wireless network 300 includes a BS 310-1 operating in a full-duplex operation mode. The BS 310-1 may receive an uplink from a UE 320-2 and transmit a downlink to a UE 320-1. The UE-320-1 and the UE 320-2 may be operating in a half-duplex operation mode. The BS 310-1 may experience downlink to uplink self-interference based at least in part on the downlink transmitted to UE 320-1 and the uplink received from UE 320-2. Additionally, BS 310-1 may experience interfering transmissions from other wireless communication devices transmitting in the wireless network 300 (e.g., from a BS 310-2). Moreover, UE 320-1 interfering transmissions from other wireless communication devices transmitting in the wireless network 300 (e.g., from the UE 320-2, from the BS 310-2, and/or the like).

As shown in FIG. 4, an example wireless network 400 includes a UE 420-1 operating in a full-duplex operation mode. The UE 420-1 may transmit an uplink to a BS 410-1 and may receive a downlink from the BS 410-1. In some aspects, the BS 410-1 may be operating in a full-duplex operation mode. The UE 420-1 may experience uplink to downlink self-interference based at least in part on the uplink transmitted to the BS 410-1 and the downlink received from the BS 410-1. The wireless network 400 may include other wireless communication devices, such as a BS 410-2 and a UE 420-2. The BS 410-2 may transmit a downlink to the UE-410-2. The UE 420-1 may experience an interfering transmission based at least in part on the transmission of the BS 410-2 and/or the UE 420-1. For example, the downlink transmitted by the BS 410-2 may have an angular spread that may cause an interfering transmission to be received by the UE 420-1. Similarly, an uplink transmitted by the UE 420-2 may have an angular spread that may cause an interfering transmission to be received by the UE 420-1.

As shown in FIG. 5, an example wireless network 500 includes a UE 520-1 operating in a full-duplex operation mode. The UE 520-1 may transmit an uplink to a BS 510-1 and may receive a downlink from a BS 510-2. The UE 520-1 may include a multi transmission and reception (multi-TRP) architecture. The UE 520-1 may experience uplink to downlink self-interference based at least in part on the uplink transmitted to the BS 510-1 and the downlink received from the BS 510-2. The BS 510-1 and the BS 510-2 may be operating in a half-duplex mode of operation. The BS 510-2 may transmit a downlink to a UE 520-2. In some aspects, the UE 520-1 may experience one or more interfering transmissions based at least in part on the transmissions of BS 510-1, BS 510-2, and/or UE 520-2.

As indicated above, FIGS. 3-5 are provided as examples. Other examples may differ from what is described with respect to FIGS. 3-5.

Figure 6:
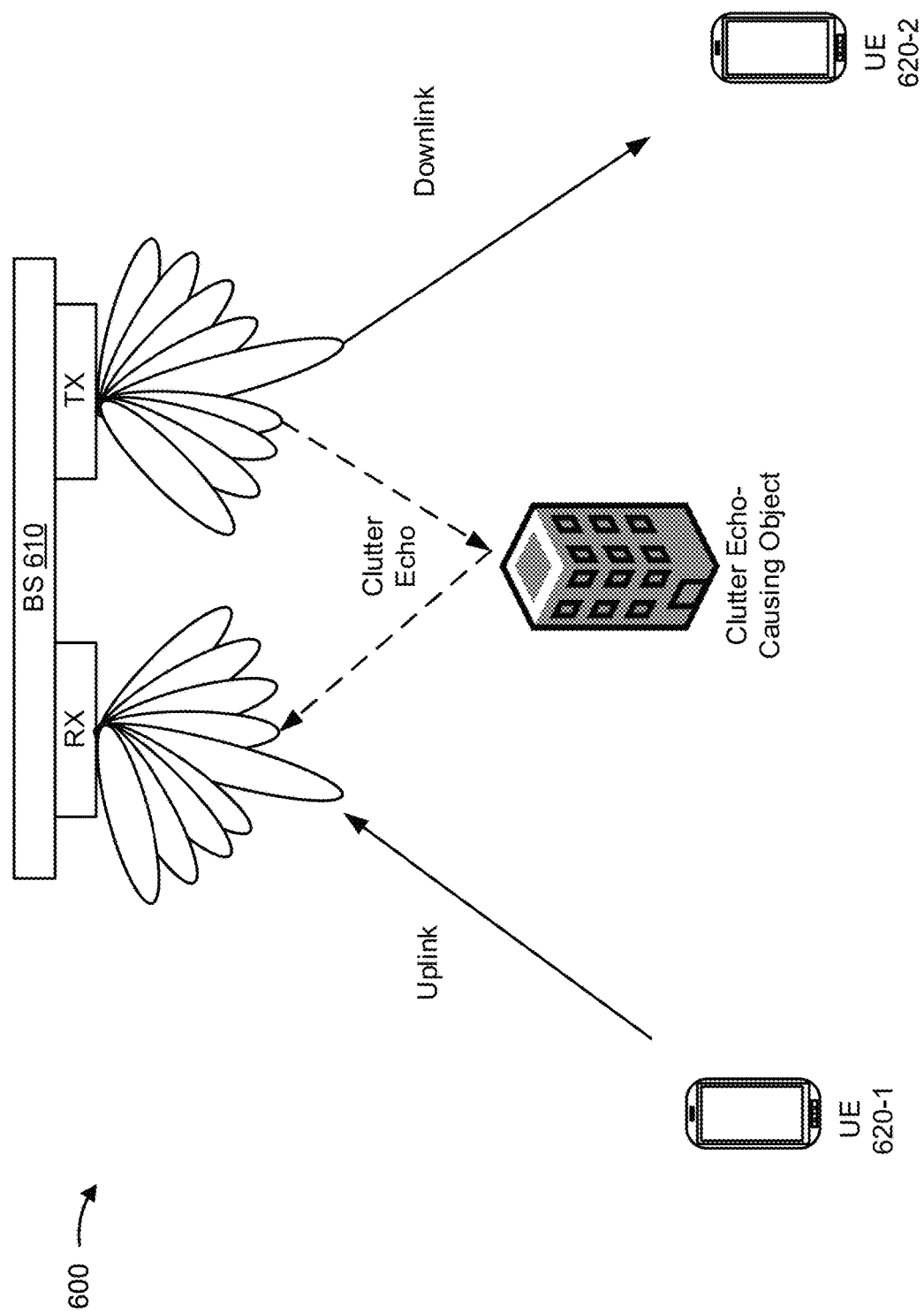
FIG. 6 is a diagram illustrating an example of clutter interference, in accordance with the present disclosure.

FIG. 6 is a diagram illustrating an example 600 of clutter interference, in accordance with the present disclosure. A wireless communication device (e.g., BS 610) operating in a full-duplex operation mode may transmit a first signal toward a first node (e.g., a downlink to a UE 620-2), but the first signal may reflect off of a surrounding object (e.g., a clutter echo-causing object), which may cause clutter echo when the first signal is reflected back toward the wireless communication device. In this case, the clutter echo may occur concurrently with the wireless communication device attempting to receive a signal from a second node (e. g., an uplink from a UE 620-1), which may result in an interruption to communication with the second node.

As shown in FIG. 6, the BS 610 may include a transmitter (TX) associated with transmitting the downlink to the UE 620-2 using a one or more TX beams and a receiver (RX) associated with receiving an uplink from the UE 620-1 using one or more RX beams. In this case, BS 610 may operate in a full-duplex operation mode, where BS 610 transmits TX beams within a threshold proximity of (e.g., concurrently with) receiving RX beams. In some aspects, based at least in part on using one or more TX beams for the downlink to UE 620-2 (e.g., using beam sweeping), one or more TX beams may be directed toward the UE 620-2, but the one or more TX beams may reflect off the clutter echo-causing object, resulting in a clutter echo. In this case, the clutter echo may be received by the BS-610 at approximately the same time as the BS-610 receives the uplink from the UE 620-1, resulting in an interruption of the uplink from the UE 620-1. However, as one or more TX beams may not reflect off the clutter echo-causing object and may reach the UE 620-2, the downlink from the BS 610 to the UE 620-2 may not experience any interruptions.

As indicated above, FIG. 6 is provided as an example. Other examples may differ from what is described with respect to FIG. 6.

In some communication systems, a wireless node, such as a BS or a UE, may operate in a full-duplex operation mode (e.g., concurrently transmitting/receiving an uplink signal and receiving/transmitting a downlink signal). The wireless node may monitor for beam failure using a beam failure detection and recovery technique. The beam failure detection and recovery technique may monitor the downlink signal (e.g., by monitoring the reference signals received power (RSRP) of the downlink signal, by monitoring the signal-to-interference-plus-noise ratio (SINR) of the downlink signal, and/or the like) to identify a downlink beam failure. A downlink beam failure may indicate an uplink beam failure as the downlink signal may correspond to the uplink signal in a full-duplex operation mode. However, in some cases, an uplink beam failure may occur in a full-duplex operation mode independent from a downlink beam failure (e.g., uplink beam failure may occur where the downlink beam is operating successfully), such as where the wireless node experiences clutter interference. As such, the wireless node may consume network resources (e.g., time, frequency, and/or spatial resources), wireless node resources (e.g., memory resources, processor resources, and/or the like), and/or the like associated with an uplink beam that has failed and not detected by the wireless node.

In some techniques and apparatuses described herein, a wireless node may provide for uplink beam failure recovery for a full-duplex operation mode. For example, the wireless node may monitor for a beam failure trigger condition on an uplink. The wireless node may detect, based at least in part on monitoring for the beam failure trigger condition, an uplink beam failure associated with the uplink. The wireless node may trigger an uplink beam failure recovery procedure based at least in part on detecting the uplink beam failure associated with the uplink. As such, the wireless node may conserve network resources, wireless node, and/or the like the would have otherwise been used transmitting and/or receiving an uplink beam that has failed.

Figure 7A:
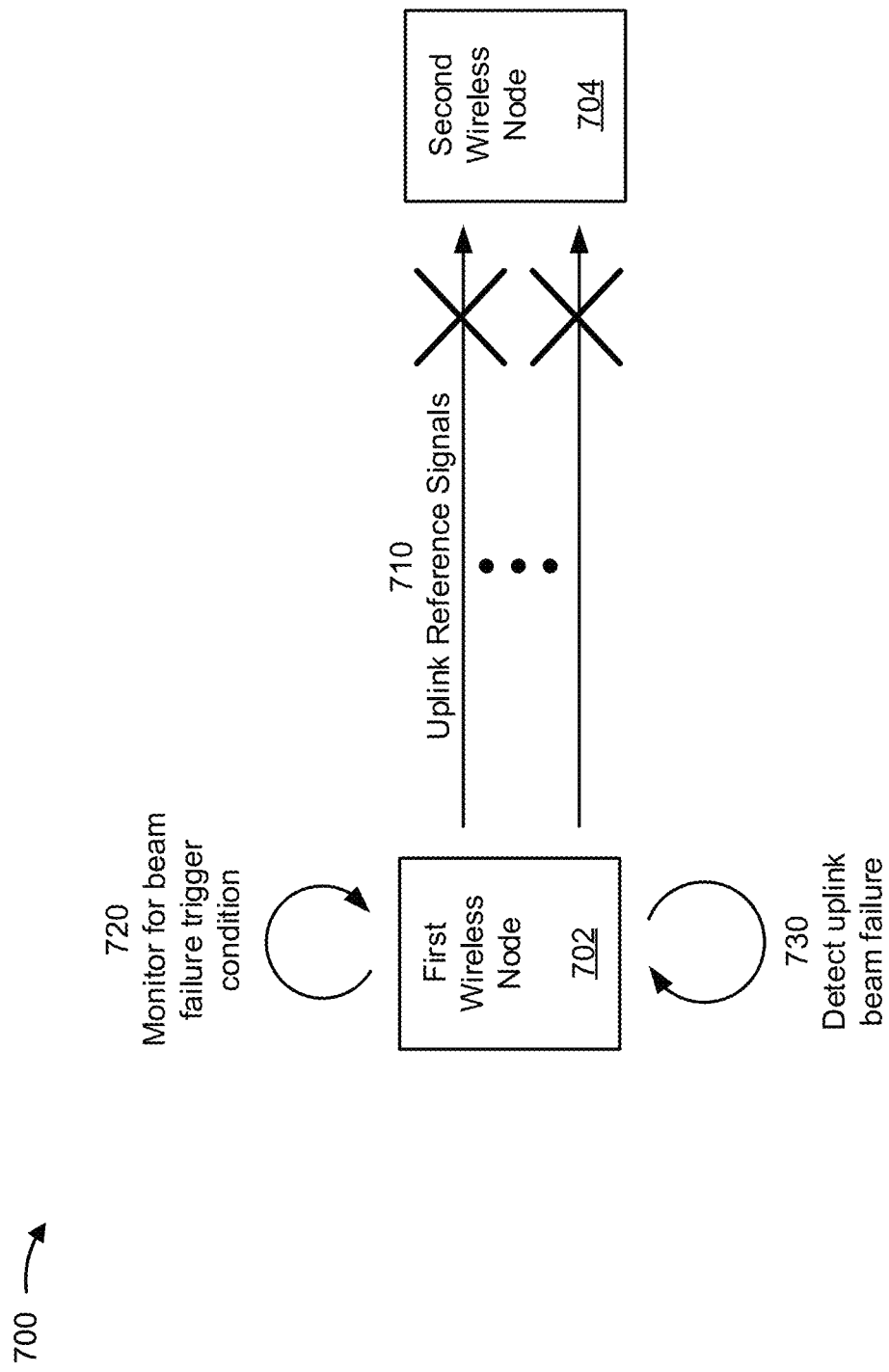
FIGS. 7A-7C are diagrams illustrating examples associated with uplink beam failure recovery for a full-duplex operation mode, in accordance with the present disclosure.
Figure 7B:
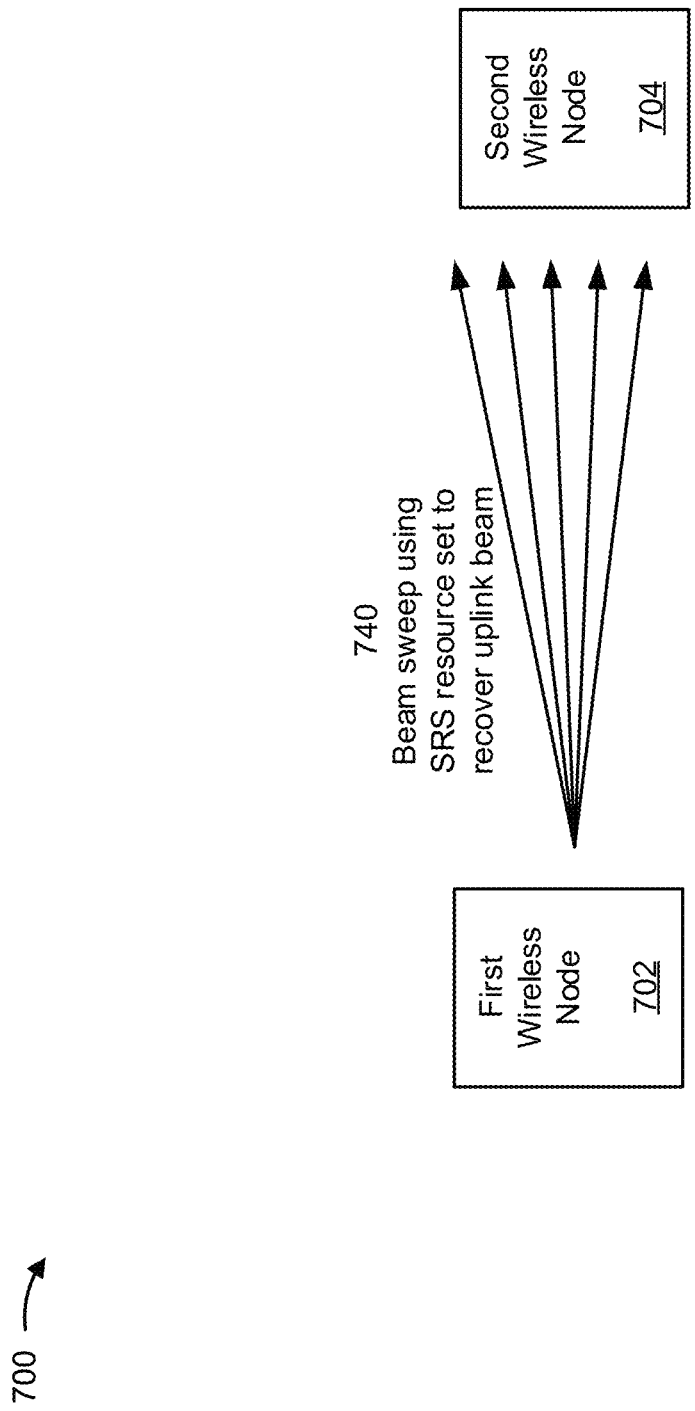
Figure 7C:
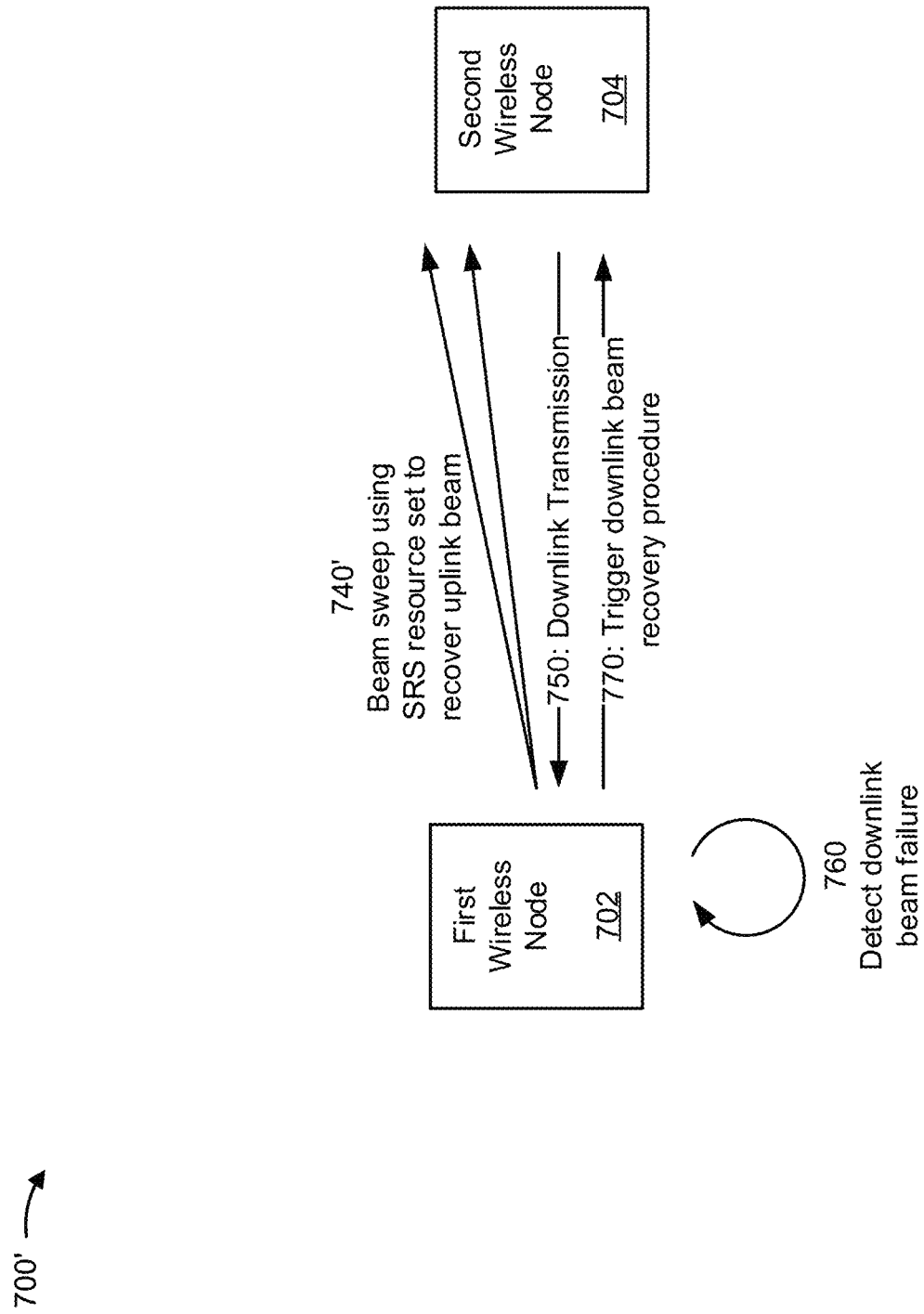

FIGS. 7A-7C are diagrams illustrating one or more examples 700/700' of uplink beam failure recovery for a full-duplex operation mode. As shown in FIG. 7A, a first wireless node (e.g., an IAB wireless node, a UE, a BS, and/or the like) may be in communication with a second wireless node. The first wireless node and/or the second wireless node may be in a full-duplex operation mode. For example, the first wireless node may be transmitting an uplink signal to the second wireless node. The second wireless node may be receiving the uplink signal from the first wireless node and transmitting a downlink signal (e.g., to the first wireless node and/or to another wireless node in a wireless network (e.g., wireless network 100)).

As shown by reference number 710, the first wireless node may transmit one or more uplink reference signals on the uplink. An uplink reference signal may be a signal that triggers one or more response communications (e.g., a downlink response), based at least in part on the uplink reference signal, from the second wireless node. The response communication may be a hybrid automatic repeat request acknowledgement (ACK) message, a hybrid automatic repeat request negative acknowledgement (NACK) message, a scheduling request (SR) response message, a physical random access channel (RACH) failure response message, and/or the like.

As shown by reference number 720, the first wireless node may monitor for a beam failure trigger condition on the uplink. The first wireless node may monitor for the beam failure trigger condition by monitoring for the one or more response communications based at least in part on transmitting the one or more uplink reference signals. The beam failure trigger condition may be based at least in part on one or more failures (e.g., not receiving the one or more response communications) based at least in part of monitoring for the more response communications. The beam failure trigger condition may be based at least in part on a threshold quantity of consecutive failures associated with monitoring for the one or more response communications, a threshold quantity of failures associated with monitoring for the one or more response communications within a threshold period of time, and/or the like.

For example, the first wireless node may transmit an uplink reference signal to the second wireless node. The first wireless node may expect a response communication from the second wireless node based at least in part on transmitting the uplink reference signal. The first wireless node may monitor for the response communication associated with the uplink reference signal. The first wireless node may detect a beam failure trigger condition based at least in part on not receiving the expected response communication from the second wireless node.

As shown by reference number 730, the first wireless node may detect an uplink beam failure associated with the uplink based at least in part on detecting a beam failure trigger condition. For example, the first wireless node may detect an uplink beam failure associated with the uplink based at least in part on detecting a threshold quantity of consecutive failures associated with monitoring for the one or more response communications, detecting a threshold quantity of failures associated with monitoring for the one or more response communications within a threshold period of time, and/or the like.

As shown in FIG. 7B, the first wireless node may trigger an uplink beam failure recovery procedure based at least in part on detecting the uplink beam failure associated with the uplink. In some aspects, the first wireless node may receive information identifying a sounding reference signal (SRS) resource set before detecting the uplink beam failure associated with the uplink. The first wireless node may be configured with a set of SRS resources for uplink beam failure recovery based at least in part on the SRS resource set.

As shown by reference number 740/740', the uplink beam failure recovery procedure may include transmitting the set of SRS using a set of beams and the SRS resource set. For example, the first wireless node may perform a beam sweep using the SRS resource set to recover the uplink beam associated with the uplink. The first wireless node may transmit the set of SRS on different beams to the second wireless node. An SRS may be used by the second wireless node to evaluate the quality of the uplink beam associated with the SRS. The first wireless node and/or the second wireless node may select an uplink beam based at least in part on the quality of the uplink beam associated with the SRS (e.g., the first wireless node and/or the second wireless node may select the uplink beam with the highest quality). The first wireless node may resume the uplink on the selected uplink beam.

As shown in FIG. 7C, and by reference number 750, the first wireless node may receive a downlink transmission from the second wireless node. The downlink transmission may be received while the first wireless node is performing the uplink beam failure recovery procedure. The first wireless node may monitor for a downlink beam failure using one or more downlink beam failure detection techniques.

As shown by reference number 760, the first wireless node may detect a downlink beam failure associated with the downlink transmission while the first wireless node is performing the uplink beam failure recovery procedure. In some aspects, the first wireless node may detect the downlink beam failure and the uplink beam failure simultaneously. The first wireless node may end the uplink beam failure recovery procedure (e.g., the first wireless node may stop transmitting the set of SRS on different beams to the second wireless node) based at least in part on detecting the downlink beam failure.

As shown by reference number 770, the first wireless node may trigger a downlink beam failure recovery procedure based at least in part on detecting the downlink beam failure. In some aspects, the first wireless node may prioritize the downlink beam failure recovery procedure over the uplink beam failure recovery procedure based at least in part on the downlink beam requiring additional actions (e.g., synchronization and/or the like) that are not required for the uplink beam.

In some aspects, the downlink beam failure recovery procedure may use a candidate beam list. The first wireless node and/or the second wireless node may evaluate different beams identified in the candidate beam list (e.g., based at least in part on an RSRP associated with the different beams, an SINR associated with the different beams, and/or the like) to identify one or more beams that satisfy a threshold (e.g., an RSRP threshold, an SINR threshold, and/or the like). The first wireless node and/or the second wireless node may select a beam to be the downlink beam from the one or more beams that satisfy a threshold RSRP as the downlink beam.

In some aspects, the candidate beam list may not be based at least in part on the uplink beam failure (e.g., the candidate beam list may be the same regardless of whether the first wireless node detects an uplink beam failure). In some aspects, the candidate beam list may be based at least in part on the uplink beam failure. For example, the candidate beam list may be a full-duplex candidate beam list. The full-duplex candidate beam list may identify one or more candidate beams based at least in part on full-duplex operation of the first wireless node and/or the second wireless node (e.g., taking into account clutter echo issues, self-interference issues, and/or the like). In this way, the full-duplex candidate beam list for downlink beam failure recovery may identify candidate beams based at least in part on uplink beam failure.

In some aspects, the first wireless node and/or the second wireless node may determine that a plurality of beams satisfy a threshold (e.g., an RSRP threshold, an SINR threshold, and/or the like) for the downlink beam failure recovery procedure (e.g., a plurality of beams may be selected as the downlink beam). The first wireless node may transmit a plurality of RACH transmissions with the plurality of beams that satisfy the threshold to enable a selection of a particular beam of the plurality of beams. The plurality of RACH transmissions may enable the first wireless node to evaluate an uplink beam associated with the plurality of beams. For example, the first wireless node may monitor for one or more response communications associated with the plurality RACH transmissions to identify if an uplink beam associated with the plurality of beams has failed (e.g., in a manner similar as described above with respect to detecting an uplink beam failure). In this way, the first wireless node may select a beam as a downlink beam based at least in part on an uplink beam associated with the downlink beam being operational (e.g., has not failed).

In some aspects, the first wireless node may monitor for the beam failure trigger condition on the uplink to determine whether the uplink is in beam failure after completion of the downlink beam failure recovery procedure. For example, the first wireless node may complete the downlink beam failure recovery procedure and select a new downlink beam. In some aspects, completing the downlink beam failure recovery procedure may cause the first wireless node to select a new uplink beam associated with the uplink. As such, the new uplink beam may be operational (e.g., has not failed). As such, the first wireless node may monitor for the beam failure trigger condition again, rather than continue the uplink beam failure recovery procedure that was ended based at least in part on detecting the downlink beam failure.

This may conserve network resources, wireless node resources, and/or the like that would have otherwise been used to perform the uplink beam failure recovery procedure when the uplink beam may be operational after completing the downlink beam failure recovery procedure.

The uplink beam failure recovery for a full-duplex operation mode may enable a wireless node to detect an uplink beam failure and recover the uplink beam when a downlink beam may be operational (e.g., when the uplink beam fails based at least in part on clutter echo and/or the like). This may conserve network resources, wireless node resources, and/or the like associated with an uplink beam that has failed and is not detected by the wireless node.

As indicated above, FIGS. 3A-3C are provided as examples. Other examples may differ from what is described with respect to FIGS. 3A-3C.

Figure 8:
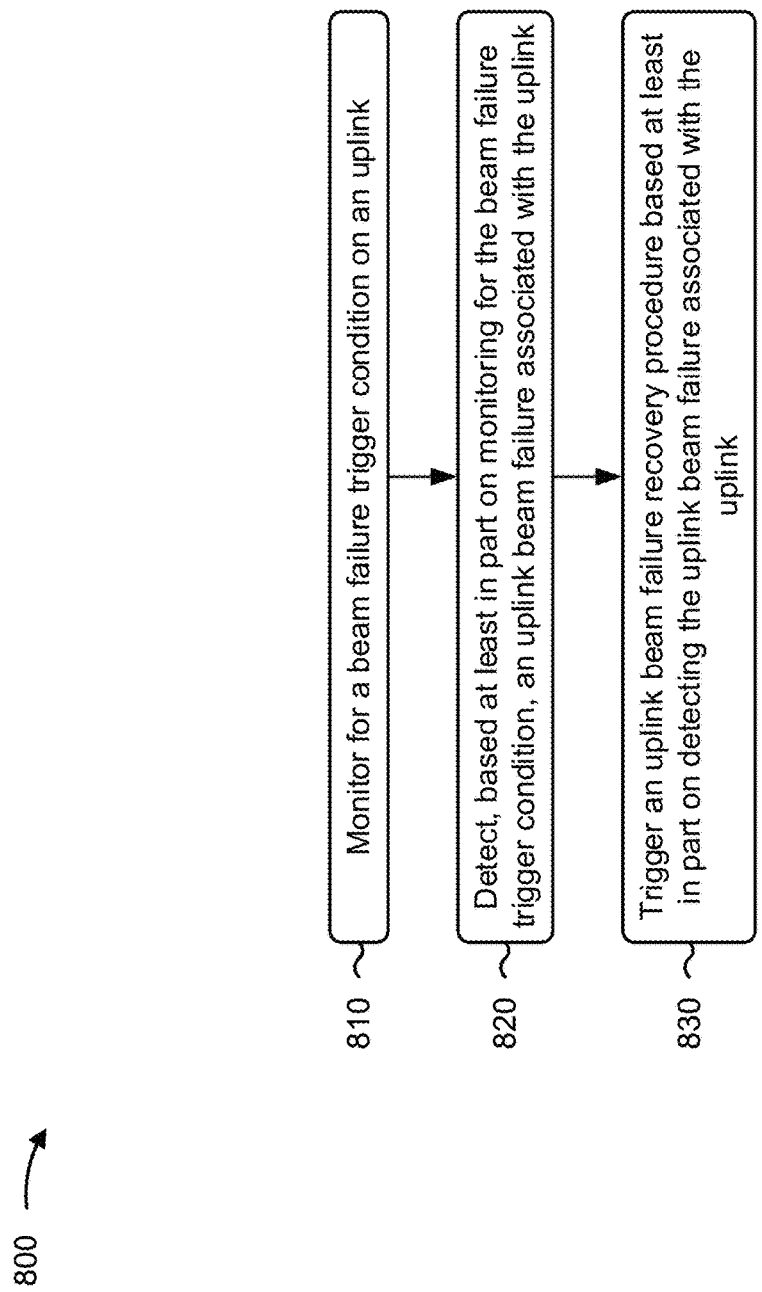
FIG. 8 is a diagram illustrating an example process associated with uplink beam failure recovery for a full-duplex operation mode, in accordance with the present disclosure.

FIG. 8 is a diagram illustrating an example process 800 performed, for example, by a wireless node, in accordance with the present disclosure. Example process 800 is an example where the wireless node (e.g., first wireless node 702, second wireless node 704, and/or the like) performs operations associated with uplink beam failure recovery for full-duplex operation.

As shown in FIG. 8, in some aspects, process 800 may include monitoring for a beam failure trigger condition on an uplink (block 810). For example, the wireless node (e.g., using receive processor 258, transmit processor 264, controller/processor 280, memory 282, and/or the like) may monitor for a beam failure trigger condition on an uplink, as described above.

As further shown in FIG. 8, in some aspects, process 800 may include detecting, based at least in part on monitoring for the beam failure trigger condition, an uplink beam failure associated with the uplink (block 820). For example, the wireless node (e.g., using receive processor 258, transmit processor 264, controller/processor 280, memory 282, and/or the like) may detect, based at least in part on monitoring for the beam failure trigger condition, an uplink beam failure associated with the uplink, as described above.

As further shown in FIG. 8, in some aspects, process 800 may include triggering an uplink beam failure recovery procedure based at least in part on detecting the uplink beam failure associated with the uplink (block 830). For example, the wireless node (e.g., using receive processor 258, transmit processor 264, controller/processor 280, memory 282, and/or the like) may trigger an uplink beam failure recovery procedure based at least in part on detecting the uplink beam failure associated with the uplink, as described above.

Process 800 may include additional aspects, such as any single aspect or any combination of aspects described below and/or in connection with one or more other processes described elsewhere herein.

In a first aspect, process 800 includes transmitting, on the uplink, one or more reference signal communications to trigger one or more response communications; and wherein monitoring for the beam failure trigger condition comprises: monitoring for the one or more response communications based at least in part on transmitting the one or more reference signal communications.

In a second aspect, alone or in combination with the first aspect, the one or more response communications include at least one of: a hybrid automatic repeat request acknowledgement message, a hybrid automatic repeat request negative acknowledgement message, a scheduling request response message, a physical random access channel failure response message, or a combination thereof.

In a third aspect, alone or in combination with one or more of the first and second aspects, detecting the uplink beam failure comprises: detecting a threshold quantity of consecutive failures associated with monitoring for the one or more response communications.

In a fourth aspect, alone or in combination with one or more of the first through third aspects, detecting the uplink beam failure comprises: detecting a threshold quantity of failures associated with monitoring for the one or more response communications within a threshold period of time.

In a fifth aspect, alone or in combination with one or more of the first through fourth aspects, process 800 includes receiving, before detecting the uplink beam failure, information identifying a sounding reference signal resource set; and triggering the uplink beam failure recovery procedure comprises: transmitting a set of sounding reference signals using a set of beams and the sounding reference signal resource set.

In a sixth aspect, alone or in combination with one or more of the first through fifth aspects, process 800 includes performing the uplink beam failure recovery procedure based at least in part on triggering the uplink beam failure recovery procedure; detecting, while performing the uplink beam failure recovery procedure, a downlink beam failure; ending the uplink beam failure recovery procedure based at least in part on detecting the downlink beam failure; and triggering a downlink beam failure recovery procedure based at least in part on detecting the downlink beam failure.

In a seventh aspect, alone or in combination with one or more of the first through sixth aspects, process 800 includes monitoring for the beam failure trigger condition on the uplink to determine whether the uplink is in beam failure after completion of the downlink beam failure recovery procedure.

In an eighth aspect, alone or in combination with one or more of the first through seventh aspects, the downlink beam failure recovery procedure uses a candidate beam list that is not based at least in part on the uplink beam failure.

In a ninth aspect, alone or in combination with one or more of the first through eighth aspects, the downlink beam failure recovery procedure uses a candidate beam list that is based at least in part on the uplink beam failure.

In a tenth aspect, alone or in combination with one or more of the first through ninth aspects, process 800 includes determining that a plurality of beams satisfy a threshold for the downlink beam failure recovery procedure; and transmitting a plurality of random access channel transmissions with the plurality of beams to enable selection of a particular beam of the plurality of beams.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
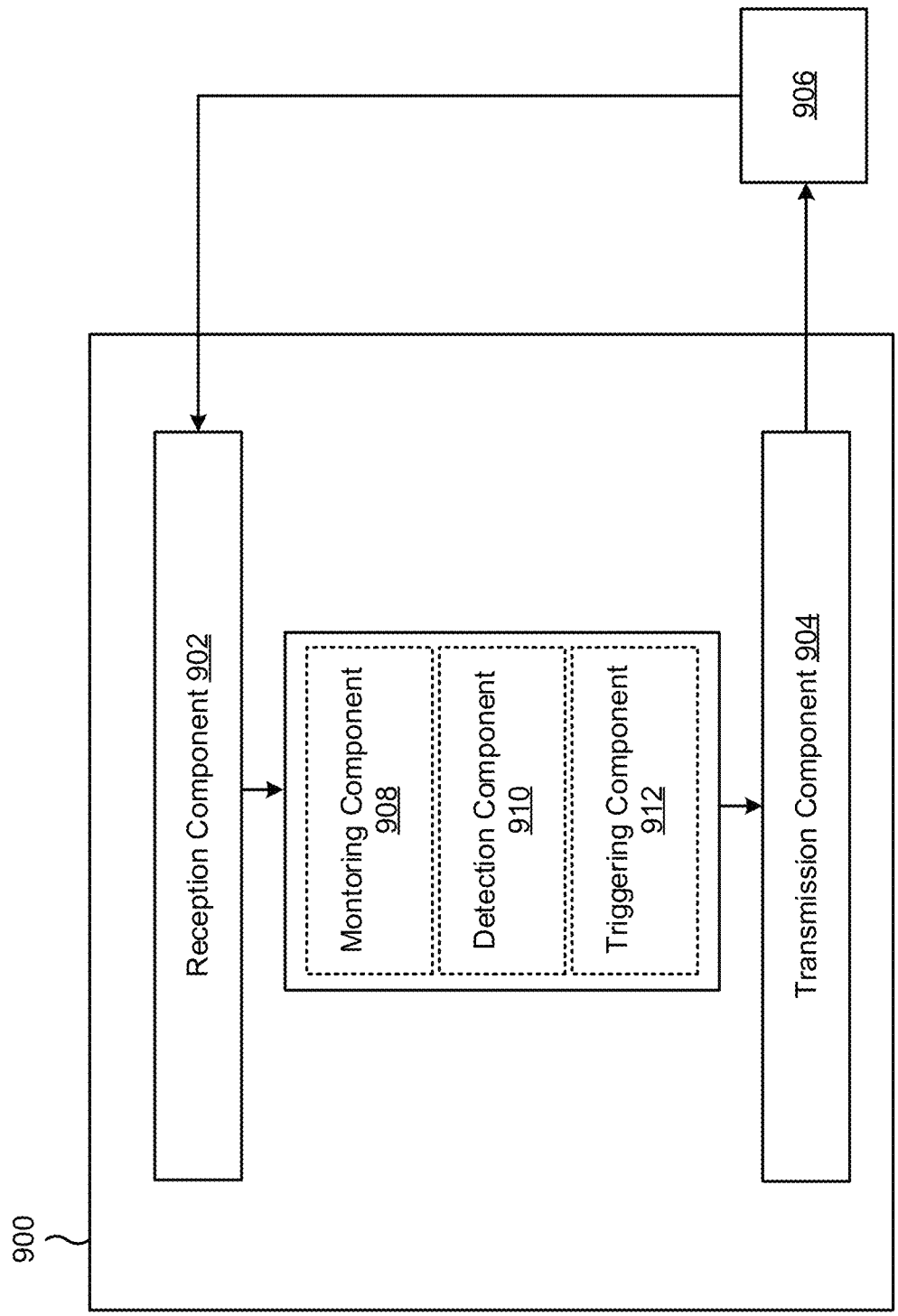
FIG. 9 is a block diagram of an example apparatus for wireless communication, in accordance with the present disclosure.

FIG. 9 is a block diagram of an example apparatus 900 for wireless communication. The apparatus 900 may be a wireless node, or a wireless node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a monitoring component 908, a detection component 910, or a triggering component 912, among other examples.

In some aspects, the apparatus 900 may be configured to perform one or more operations described herein in connection with FIGS. 7A-7C. Additionally, or alternatively, the apparatus 900 may be configured to perform one or more processes described herein, such as process 800 of FIG. 8. In some aspects, the apparatus 900 and/or one or more components shown in FIG. 9 may include one or more components of the wireless node described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the wireless node described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the wireless node described above in connection with FIG. 2. In some aspects, the transmission component 904 may be co-located with the reception component 902 in a transceiver.

The monitoring component 908 may monitor for a beam failure trigger condition on an uplink. The detection component 910 may detect, based at least in part on monitoring for the beam failure trigger condition, an uplink beam failure associated with the uplink. The triggering component 912 may trigger an uplink beam failure recovery procedure based at least in part on detecting the uplink beam failure associated with the uplink.

The transmission component 904 may transmit, on the uplink, one or more reference signal communications to trigger one or more response communications.

The reception component 902 may receive, before detecting the uplink beam failure, information identifying a sounding reference signal resource set.

The reception component 902 and/or the transmission component 904 may perform the uplink beam failure recovery procedure based at least in part on triggering the uplink beam failure recovery procedure.

The detection component 910 may detect, while performing the uplink beam failure recovery procedure, a downlink beam failure.

The reception component 902 and/or the transmission component 904 may end the uplink beam failure recovery procedure based at least in part on detecting the downlink beam failure.

The triggering component 912 may trigger a downlink beam failure recovery procedure based at least in part on detecting the downlink beam failure.

The monitoring component 908 may monitor for the beam failure trigger condition on the uplink to determine whether the uplink is in beam failure after completion of the downlink beam failure recovery procedure.

The detection component 910 may determine that a plurality of beams satisfy a threshold for the downlink beam failure recovery procedure.

The transmission component 904 may transmit a plurality of random access channel transmissions with the plurality of beams to enable selection of a particular beam of the plurality of beams.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a wireless node, comprising: monitoring for a beam failure trigger condition on an uplink; detecting, based at least in part on monitoring for the beam failure trigger condition, an uplink beam failure associated with the uplink; and triggering an uplink beam failure recovery procedure based at least in part on detecting the uplink beam failure associated with the uplink.

Aspect 2: The method of Aspect 1, further comprising: transmitting, on the uplink, one or more reference signal communications to trigger one or more response communications; and wherein monitoring for the beam failure trigger condition comprises: monitoring for the one or more response communications based at least in part on transmitting the one or more reference signal communications. wherein monitoring for the beam failure trigger condition comprises: monitoring for the one or more response communications based at least in part on transmitting the one or more reference signal communications.

Aspect 3: The method of Aspect 2, wherein the one or more response communications include at least one of: a hybrid automatic repeat request acknowledgement message, a hybrid automatic repeat request negative acknowledgement message, a scheduling request response message, a physical random access channel failure response message, or a combination thereof.

Aspect 4: The method of any of Aspects 2 to 3, wherein detecting the uplink beam failure comprises: detecting a threshold quantity of consecutive failures associated with monitoring for the one or more response communications.

Aspect 5: The method of any of Aspects 2 to 4, wherein detecting the uplink beam failure comprises: detecting a threshold quantity of failures associated with monitoring for the one or more response communications within a threshold period of time.

Aspect 6: The method of any of Aspects 1 to 5, further comprising: receiving, before detecting the uplink beam failure, information identifying a sounding reference signal resource set; and wherein triggering the uplink beam failure recovery procedure comprises: transmitting a set of sounding reference signals using a set of beams and the sounding reference signal resource set. wherein triggering the uplink beam failure recovery procedure comprises: transmitting a set of sounding reference signals using a set of beams and the sounding reference signal resource set.

Aspect 7: The method of any of Aspects 1 to 6, further comprising: performing the uplink beam failure recovery procedure based at least in part on triggering the uplink beam failure recovery procedure; detecting, while performing the uplink beam failure recovery procedure, a downlink beam failure; ending the uplink beam failure recovery procedure based at least in part on detecting the downlink beam failure; and triggering a downlink beam failure recovery procedure based at least in part on detecting the downlink beam failure.

Aspect 8: The method of Aspect 7, further comprising: monitoring for the beam failure trigger condition on the uplink to determine whether the uplink is in beam failure after completion of the downlink beam failure recovery procedure.

Aspect 9: The method of any of Aspects 7 to 8, wherein the downlink beam failure recovery procedure uses a candidate beam list that is not based at least in part on the uplink beam failure.

Aspect 10: The method of any of Aspects 7 to 9, wherein the downlink beam failure recovery procedure uses a candidate beam list that is based at least in part on the uplink beam failure.

Aspect 11: The method of any of Aspects 7 to 10, further comprising: determining that a plurality of beams satisfy a threshold for the downlink beam failure recovery procedure; and transmitting a plurality of random access channel transmissions with the plurality of beams to enable selection of a particular beam of the plurality of beams.

Aspect 12: An apparatus for wireless communication at a device, comprising a processor; memory coupled with the processor; and instructions stored in the memory and executable by the processor to cause the apparatus to perform the method of one or more Aspects of Aspects 1-11.

Aspect 13: A device for wireless communication, comprising a memory and one or more processors coupled to the memory, the memory and the one or more processors configured to perform the method of one or more Aspects of Aspects 1-11.

Aspect 14: An apparatus for wireless communication, comprising at least one means for performing the method of one or more Aspects of Aspects 1-11.

Aspect 15: A non-transitory computer-readable medium storing code for wireless communication, the code comprising instructions executable by a processor to perform the method of one or more Aspects of Aspects 1-11.

Aspect 16: A non-transitory computer-readable medium storing a set of instructions for wireless communication, the set of instructions comprising one or more instructions that, when executed by one or more processors of a device, cause the device to perform the method of one or more Aspects of Aspects 1-11.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless node for wireless communication, comprising:
 a memory; and
 one or more processors, coupled to the memory, configured to:
  monitor for a beam failure trigger condition on an uplink;
  detect, in accordance with monitoring for the beam failure trigger condition, an uplink beam failure associated with the uplink;
  trigger an uplink beam failure recovery procedure in accordance with detecting the uplink beam failure associated with the uplink;
  perform the uplink beam failure recovery procedure in accordance with triggering the uplink beam failure recovery procedure;
  detect, while performing the uplink beam failure recovery procedure, a downlink beam failure;
  end the uplink beam failure recovery procedure in accordance with detecting the downlink beam failure; and
  trigger a downlink beam failure recovery procedure in accordance with detecting the downlink beam failure.

2. The wireless node of claim 1, wherein the one or more processors are further configured to:
 transmit, on the uplink, one or more reference signal communications to trigger one or more response communications; and
 wherein the one or more processors, to monitor for the beam failure trigger condition, are configured to:
  monitor for the one or more response communications in accordance with transmitting the one or more reference signal communications.

3. The wireless node of claim 2, wherein the one or more response communications include at least one of:
 a hybrid automatic repeat request acknowledgement message,
 a hybrid automatic repeat request negative acknowledgement message,
 a scheduling request response message,
 a physical random access channel failure response message, or
 a combination thereof.

4. The wireless node of claim 2, wherein the one or more processors, to detect the uplink beam failure, are configured to:
 detect a threshold quantity of consecutive failures associated with monitoring for the one or more response communications.

5. The wireless node of claim 2, wherein the one or more processors, to detect the uplink beam failure, are configured to:
 detect a threshold quantity of failures associated with monitoring for the one or more response communications within a threshold period of time.

6. The wireless node of claim 1, wherein the one or more processors are further configured to:
 receive, before detecting the uplink beam failure, information identifying a sounding reference signal resource set; and
 wherein the one or more processors, to trigger the uplink beam failure recovery procedure, are configured to:
  transmit a set of sounding reference signals using a set of beams and the sounding reference signal resource set.

7. The wireless node of claim 1, wherein the one or more processors are further configured to:
 monitor for the beam failure trigger condition on the uplink to determine whether the uplink is in beam failure after completion of the downlink beam failure recovery procedure.

8. The wireless node of claim 1, wherein the downlink beam failure recovery procedure uses a candidate beam list that is not in accordance with the uplink beam failure.

9. The wireless node of claim 1, wherein the downlink beam failure recovery procedure uses a candidate beam list that is in accordance with the uplink beam failure.

10. The wireless node of claim 1, wherein the one or more processors are further configured to:
 determine that a plurality of beams satisfy a threshold for the downlink beam failure recovery procedure; and
 transmit a plurality of random access channel transmissions with the plurality of beams to enable selection of a particular beam of the plurality of beams.

11. A method of wireless communication performed by a wireless node, comprising:
 monitoring for a beam failure trigger condition on an uplink;
 detecting, in accordance with monitoring for the beam failure trigger condition, an uplink beam failure associated with the uplink; and
 triggering an uplink beam failure recovery procedure in accordance with detecting the uplink beam failure associated with the uplink;
 performing the uplink beam failure recovery procedure in accordance with triggering the uplink beam failure recovery procedure;
 detecting, while performing the uplink beam failure recovery procedure, a downlink beam failure;
 ending the uplink beam failure recovery procedure in accordance with detecting the downlink beam failure; and
 triggering a downlink beam failure recovery procedure in accordance with detecting the downlink beam failure.

12. The method of claim 11, further comprising:
 transmitting, on the uplink, one or more reference signal communications to trigger one or more response communications; and
 wherein monitoring for the beam failure trigger condition comprises:
  monitoring for the one or more response communications in accordance with transmitting the one or more reference signal communications.

13. The method of claim 12, wherein the one or more response communications include at least one of:
 a hybrid automatic repeat request acknowledgement message,
 a hybrid automatic repeat request negative acknowledgement message, a scheduling request response message,
a physical random access channel failure response message, or
a combination thereof.

14. The method of claim 12, wherein detecting the uplink beam failure comprises:
detecting a threshold quantity of consecutive failures associated with monitoring for the one or more response communications.

15. The method of claim 12, wherein detecting the uplink beam failure comprises:
detecting a threshold quantity of failures associated with monitoring for the one or more response communications within a threshold period of time.

16. The method of claim 11, further comprising:
receiving, before detecting the uplink beam failure, information identifying a sounding reference signal resource set; and
wherein triggering the uplink beam failure recovery procedure comprises:
transmitting a set of sounding reference signals using a set of beams and the sounding reference signal resource set.

17. The method of claim 11, further comprising:
monitoring for the beam failure trigger condition on the uplink to determine whether the uplink is in beam failure after completion of the downlink beam failure recovery procedure.

18. The method of claim 11, wherein the downlink beam failure recovery procedure uses a candidate beam list that is not in accordance with the uplink beam failure.

19. The method of claim 11, wherein the downlink beam failure recovery procedure uses a candidate beam list that is in accordance with the uplink beam failure.

20. The method of claim 11, further comprising:
determining that a plurality of beams satisfy a threshold for the downlink beam failure recovery procedure; and
transmitting a plurality of random access channel transmissions with the plurality of beams to enable selection of a particular beam of the plurality of beams.

21. A non-transitory computer-readable medium storing a set of instructions for wireless communication, the set of instructions comprising:
one or more instructions that, when executed by one or more processors of a wireless node, cause the wireless node to:
monitor for a beam failure trigger condition on an uplink;
detect, in accordance with monitoring for the beam failure trigger condition, an uplink beam failure associated with the uplink;
trigger an uplink beam failure recovery procedure in accordance with detecting the uplink beam failure associated with the uplink;
perform the uplink beam failure recovery procedure in accordance with triggering the uplink beam failure recovery procedure;
detect, while performing the uplink beam failure recovery procedure, a downlink beam failure;
end the uplink beam failure recovery procedure in accordance with detecting the downlink beam failure; and
trigger a downlink beam failure recovery procedure in accordance with detecting the downlink beam failure.

22. The non-transitory computer-readable medium of claim 21, wherein the one or more instructions further cause the wireless node to:
transmit, on the uplink, one or more reference signal communications to trigger one or more response communications; and
wherein the one or more instructions, that cause the wireless node to monitor for the beam failure trigger condition, cause the wireless node to:
monitor for the one or more response communications in accordance with transmitting the one or more reference signal communications.

23. The non-transitory computer-readable medium of claim 22, wherein the one or more response communications include at least one of:
a hybrid automatic repeat request acknowledgement message,
a hybrid automatic repeat request negative acknowledgement message,
a scheduling request response message,
a physical random access channel failure response message, or
a combination thereof.

24. The non-transitory computer-readable medium of claim 22, wherein the one or more instructions, that cause the wireless node to detect the uplink beam failure, cause the wireless node to:
detect a threshold quantity of consecutive failures associated with monitoring for the one or more response communications.

25. An apparatus for wireless communication, comprising:
means for monitoring for a beam failure trigger condition on an uplink;
means for detecting, in accordance with monitoring for the beam failure trigger condition, an uplink beam failure associated with the uplink;
means for triggering an uplink beam failure recovery procedure in accordance with detecting the uplink beam failure associated with the uplink;
means for performing the uplink beam failure recovery procedure in accordance with triggering the uplink beam failure recovery procedure;
means for detecting, while performing the uplink beam failure recovery procedure, a downlink beam failure;
means for ending the uplink beam failure recovery procedure in accordance with detecting the downlink beam failure; and
means for triggering a downlink beam failure recovery procedure in accordance with detecting the downlink beam failure.

26. The apparatus of claim 25, further comprising:
means for transmitting, on the uplink, one or more reference signal communications to trigger one or more response communications; and
wherein the means for monitoring for the beam failure trigger condition comprises:
means for monitoring for the one or more response communications in accordance with transmitting the one or more reference signal communications.

27. The apparatus of claim 26, wherein the one or more response communications include at least one of:
a hybrid automatic repeat request acknowledgement message,
a hybrid automatic repeat request negative acknowledgement message,
a scheduling request response message, a physical random access channel failure response message, or a combination thereof.

28. The apparatus of claim 26, wherein the means for detecting the uplink beam failure comprises:

means for detecting a threshold quantity of consecutive failures associated with monitoring for the one or more response communications.

\* \* \* \* \*